United States Patent [19]

Fei et al.

[11] Patent Number: 6,102,376
[45] Date of Patent: Aug. 15, 2000

[54] FLEXIBLE MINI-RING IN THE PLUM FLOWER SHAPE

[75] Inventors: Weiyang Fei; Xiaoming Wen, both of Beijing, China

[73] Assignee: Tsinghua University, Beijing, China

[21] Appl. No.: 09/091,276

[22] PCT Filed: Dec. 19, 1996

[86] PCT No.: PCT/CN96/00111

§ 371 Date: Jun. 12, 1998

§ 102(e) Date: Jun. 12, 1998

[87] PCT Pub. No.: WO97/23286

PCT Pub. Date: Jul. 3, 1997

[30] Foreign Application Priority Data

Dec. 22, 1995 [CN] China .................................. 95117866

[51] Int. Cl.[7] .................................................... B01F 3/04
[52] U.S. Cl. ...................................... 261/94; 261/DIG. 72
[58] Field of Search ............................... 261/94, DIG. 72

[56] References Cited

U.S. PATENT DOCUMENTS

| | | | |
|---|---|---|---|
| 3,266,787 | 8/1966 | Eckert | 261/94 |
| 4,041,113 | 8/1977 | McKeown | 261/DIG. 72 |
| 4,333,892 | 6/1982 | Ellis et al. | 261/DIG. 72 |
| 4,575,435 | 3/1986 | Kuhl . | |
| 5,298,164 | 3/1994 | Hapach et al. . | |

FOREIGN PATENT DOCUMENTS

| | | |
|---|---|---|
| 0143902 | 6/1985 | European Pat. Off. . |
| 2303926 | 10/1976 | France . |
| 1541433 | 2/1979 | United Kingdom . |

*Primary Examiner*—C. Scott Bushey
*Attorney, Agent, or Firm*—Shook, Hardy & Bacon L.L.P.

[57] ABSTRACT

The present invention is a kind of flexible plum flower mini ring which is used in chemical separation equipment. The packing consists of a mini ring with plum flower shape and rectangular windows and connected inner arc strips on its petals. There is a smaller flap cut from the middle of the inner arc strip which is bent into the center of the mini ring. The present invention can be used in normal or high pressure distillation, absorption and stripping with heavy liquid load and solvent extraction (lube-oil refining, aromatic separation and so on).

6 Claims, 3 Drawing Sheets

FLEXIBLE MINI-RING IN THE PLUM FLOWER SHAPE

CROSS REFERENCE TO RELATED APPLICATIONS

"Not Applicable"

STATEMENT REGARDING FEDERALLY SPONSORED RESEARCH OR DEVELOPMENT

"Not Applicable"

BACKGROUND OF THE INVENTION

The present invention relates to a flexible plum flower mini ring which is to be used in packed mass transfer equipment.

The packed column is an important class of mass transfer equipment which is widely used for distillation, absorption and extraction in the fields of chemical, petrochemical, pharmaceutical industry, environmental control and etc. The structure and performance of the packing have a key impact on the technical and economic performance of the separation processes, which are essential in many industrial processes. Therefore, systematic research on the structure and characteristics of packings have been carried out all over the world for many years. A variety of packings have been developed which can be divided into two categories—random packing and structured packing. Random packing is more suitable for high and normal pressure distillation and solvent extraction while structured packing is more suitable for vacuum distillation. Random packing is easy to manufacture and install and is relatively low cost. Therefore, it has a wide range of uses. The present invention belongs to the random packing category.

There are many kinds of random packings, such as Raching Ring, Pall Ring, Cascade Ring, Intalox Saddle and others. Among these, the Cascade Ring and the Inner Arc Stripe Mini Ring (SMR) which have low height/diameter ratio have distinctive characteristics.

The structure of the known Cascade Ring is shown in FIGS. 1 and 2 of the attached drawing. It is shown from the figures that 1 is the metal piece used to make the packing; 2 is the tongue-shaped strip; 3 is the opening in the ring wall and 4 is the awl flange. The height/diameter ratio of the packing is 0.5 which is only half that of the known Pall Ring. Because of this aspect ratio, when this packing is installed in a tower it tends to orient in a more structured way such that its inner surface could be more efficient. All these features, therefore, decrease its pressure drop and increase the mass transfer efficiency. However, its height/diameter ratio can be decreased further, its inner structure could be improved, and its structure demands a thick sheet of material which is expensive.

The known SMR construction is described in Chinese Invention Patent (ZL 89109152.1). FIG. 3 is its front view and FIG. 4 is its top view. It is shown from the figures that the packing has the following characteristics:

1. The special designed inner stripes either improve the inner flow paths or increase the strength of the packing. There is no flange for the packing which might cause the coalescence of drop swarm or coking.
2. The low height/diameter ratio of 0.3 ensures better ordering in random packed columns. Therefore, this feature can decrease the pressure drop, control the non-ideal flow of two phases and then increase the capacity and mass transfer efficiency of the packing.
3. The packing is easy to manufacture and can be made from many kinds of materials for a variety of demands.

Though this new packing has excellent performance, it still could be improved a step further. For example, the ring shape of the packing limits the special area, the inner flow channel could be divided further and the firm structure needs thick sheets and consumes more material too.

BRIEF SUMMARY OF THE INVENTION

The aim of this invention is, therefore, to increase the specific surface area, to increase the mass transfer efficiency and to decrease the amount of material used.

In accordance with the objects of the present invention which are evident from the following detailed description of a preferred embodiment, a flexible plum flower mini ring is provided which includes an outer wall of packing material formed in the shape of a plum flower and presenting a plurality of arcuate petals. At least one window is formed in each petal of the outer wall and presents side edges to which an inner strip of packing material is connected. The inner strip of packing material extends inboard of the outer wall, and a flap is formed on each inner strip and is bend inward relative to the outer wall such that the inner area of the ring is divided into a plurality of relatively small zones.

By constructing a packing in accordance with the present invention, numerous advantages are achieved. For example, by forming the packing of a plum flower shape with rectangular windows and connected inner arc strips on the petals, the packing demonstrates outstanding advantages such as excellent mass transfer performance, large capacity, low pressure drop, low cost, etc., and can be used in normal or high pressure distillation, absorption and stripping with heavy liquid load and solvent extraction (lube-oil refining, aromatic separation and so on).

BRIEF DESCRIPTION OF THE SEVERAL VIEWS OF THE DRAWING

The preferred embodiment of the present invention is described in detail below with reference to the attached drawing figures, wherein.

DETAILED DESCRIPTION OF THE INVENTION

This invention is a flexible plum flower mini ring packing which is characterized by its plum flower shape. The packing consists of several petals. One pair of adjacent petals is not connected and has a small bend respectively leaving a flexing space at the joint. Every plum petal has one rectangular window which is connected with the inner arc strip by two short sides. There is another small rectangular opening at the middle of every inner arc strip. A small flap is cut from said inner arc strip and bent inwards toward the center of the mini ring. The height/diameter ratio is 0.2–0.3 while the plum flower has 4 to 7 petals.

Figure 1:
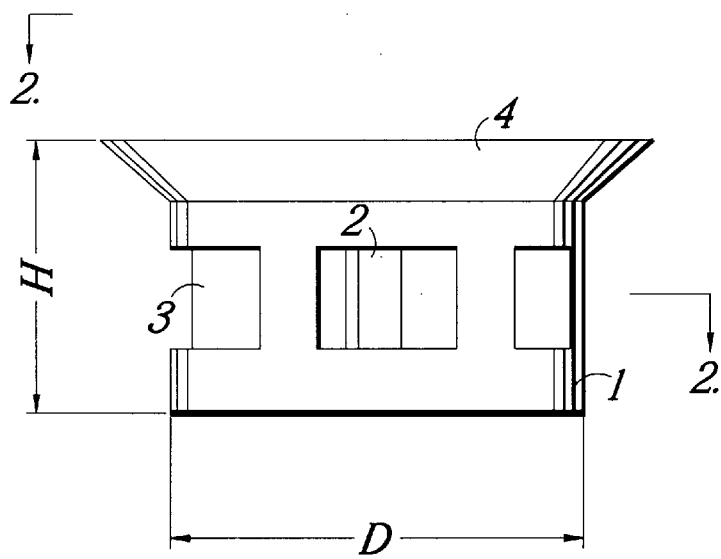
FIG. 1 is a front elevational view of a prior art cascade ring packing.
Figure 2:
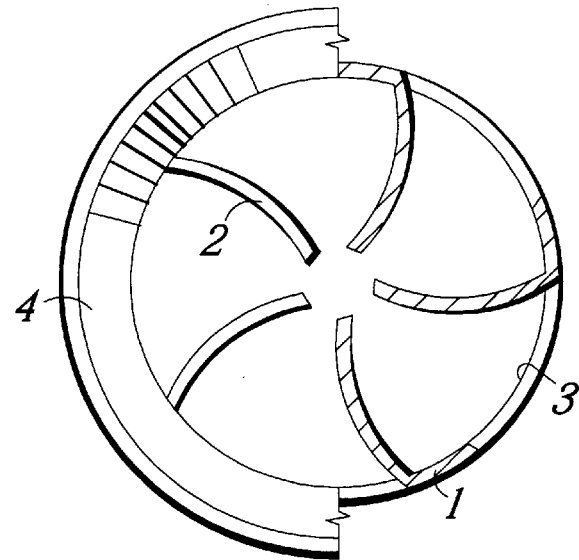
FIG. 2 is a sectional view of the prior art cascade ring packing, taken along line a-b-a of FIG. 1.
Figure 3:
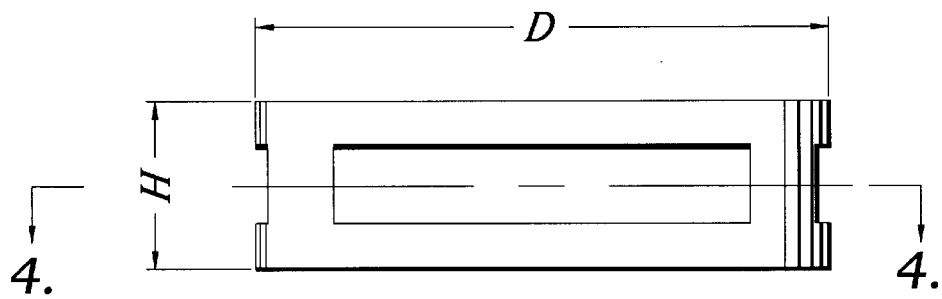
FIG. 3 is a front elevational view of a prior art inner arc stripe mini ring packing.
Figure 4:
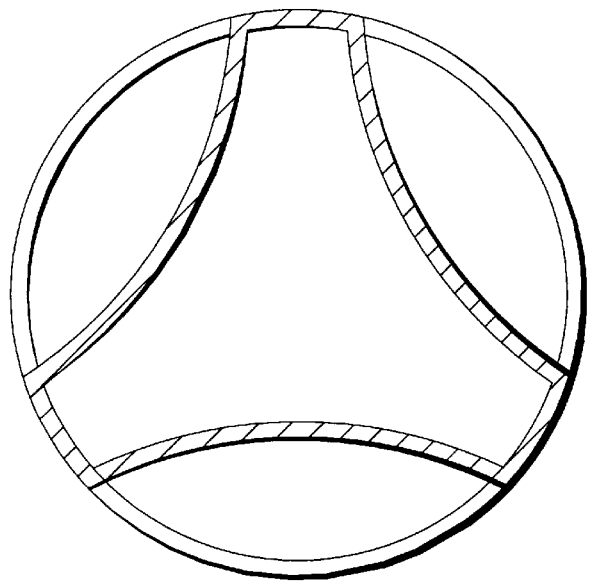
FIG. 4 is a sectional view of the inner arc stripe mini ring packing, taken along line a—a of FIG. 3.
Figure 5:
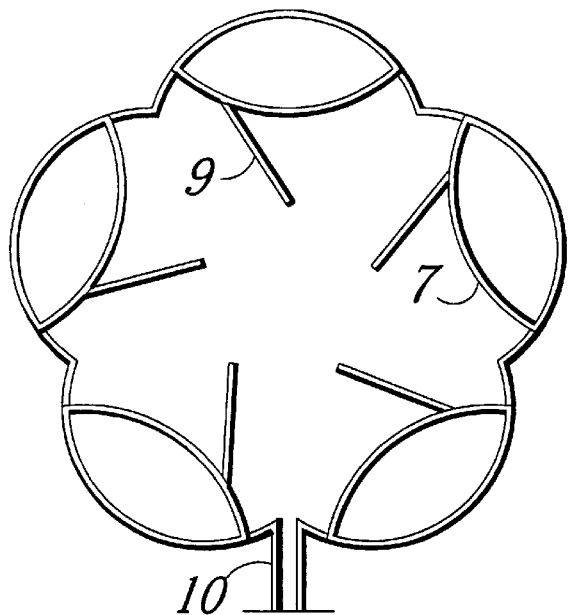
FIG. 5 is a top plan view of a plum flower mini ring packing constructed in accordance with the preferred embodiment.
Figure 6:
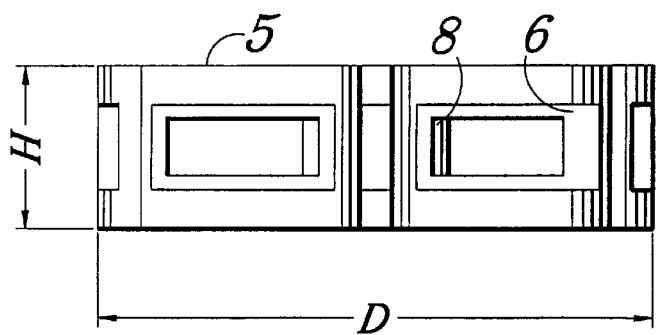
FIG. 6 is a front elevational view of the plum flower mini ring packing of the preferred embodiment.

FIGS. 5 and 6 are the front and top views of the preferred embodiment of the present invention which has five petals. As shown in the figures, 5 is the metal ring of the preferred packing, 6 is the rectangular window on the ring wall, 7 is the inner arc strip connected with the rectangular windows, 8 is the small rectangular opening on said inner arc strips, 9 is the small flap of which one end points inwards toward the ring center while the other end is connected with the small rectangular opening. One pair of adjacent but not connected petals has small bends between them which is a kind of flexible structure used to prevent the packing from being forced out of shape. The five inner arc strips and the five small flaps which point toward the ring center divide the inner area of the mini ring into ten smaller zones. When the two phases pass through the packing bed countercurrently, these internals enhance the dispersion-coalescence-re-dispersion cycle, promote the renewal of the mass transfer surface. This kind of elaborate structure could control the non-ideal flow of the continue phases as well. The special area of the new packing is larger than the SMR, and much larger than the Cascade Ring or Pall Ring with the same nominal diameters.

This packing could be made using relative thin metal sheets. By providing the inner arc stripe, every petal section has enough strength while the whole packing has sufficient flexibility. Furthermore, the pair of small bends could control the packing distortion.

The extra low height/diameter ratio of the preferred packing (0.2 to 0.3) will ensure more order within the column than the traditional packing. It is difficult for the packing to stand on its side, therefore, the packing orients itself horizontally. These features decrease the pressure drop and axial mixing, increase the capacity and improve the mass transfer efficiency.

The present invention has achieved the anticipated results. The plum flower shape increased its specific area. The inner arc striped and the small flaps which point inward toward the ring center enhance the surface renewal and control the non-ideal flow of two phases; extra low height/diameter ratio (0.2–0.3) can ensure more order; the flexible structure could reduce the thickness of the metal sheet to save weight and to make the packing less expensive. Therefore, the present invention has many advantages such as high mass transfer efficiency, high capacity, low pressure drop, low cost and etc.

The comparison of the mass transfer performance between the φ25 mm flexible plum flower mini ring and φ25 mm SMR under the same operational conditions are shown in Table 1. The experiments were carried out in a column with 100 mm ID and 1000 mm working section. The test system is 50% TBP (Kerosene)-acetic acid-water which has middle range interfacial tension. The aqueous flow rate, Qa, and the organic phase flow rate, Qo, are in 1/hr. The NTU is the Number of Transfer Units in 1 meter height packed bed. The higher the NTU, the better the mass transfer efficiency of the packing. It is clear from the table that the mass transfer efficiencies of this invention are about 20% higher than the SMR in average. Considering the mass transfer efficiency of SMR higher than that of Pall Ring's, Intalox Saddle's and Mellapak's for solvent extraction (Fei, W., et al., 1993 Proceeding of ISEC-93, Vol. 1, P. 49, York, U.K.), the mass transfer performance of the present invention is excellent indeed.

TABLE 1

The Comparison of Mass Transfer Efficiencies of Two Packings

| Run No. | Qa (1/hr) | Qo (1/hr) | $(NTU)_1$ | $(NTU)_2$ | ΔN/N (%) |
|---|---|---|---|---|---|
| 1 | 76.8 | 68.0 | 0.911 | 0.726 | 23.6 |
| 2 | 76.8 | 85.0 | 0.872 | 0.830 | 4.8 |
| 3 | 76.8 | 102.0 | 1.51 | 1.15 | 23.8 |
| 4 | 76.8 | 119.0 | 1.90 | 1.34 | 29.5 |
| 5 | 76.8 | 136.0 | 2.02 | 1.54 | 23.7 |

Notes:
$(NTU)_1$ is for SMR;
$(NTU)_2$ is for the present invention.

The geometry of φ50 mm Pall Ring, Cascade Ring, SMR and the present invention are listed in Table 2. It is shown from the data listed that the present invention has the lowest packing density, the largest special area and the highest voidage among the four packings with the same nominal diameter.

TABLE 2

The Comparison of Geometry of Different Packings (φ 50 mm)

| type | N (1/M3) | γ (kg/M3) | a (M2/M3) | ε (%) |
|---|---|---|---|---|
| Pall Ring | 6500 | 395 | 105 | 94.9 |
| Cascade Ring | 11600 | 400 | 109 | 95.0 |
| SMR | 22000 | 355 | 120 | 95.5 |
| Present Invention | 22000 | 295 | 132 | 96.2 |

Notes:
N is the number of packing per cubic meter
γ is the packing density (kg/M3);
a is the special area (M2/M3);
ε is the voidage of the packing (%).

In summary, the present invention has excellent mass transfer efficiency, large capacity, low pressure drop, and low cost which are significant and important advantages over other packings. Therefore, it can be used in normal or high pressure distillation, absorption and stripping with heavy liquid load and solvent extraction (lube-oil refining, aromatic separation and so on). If the present invention could be used for the revamping, the mass transfer efficiency and capacity of the column would be improved impressively, and the economical income would be great.

The cases implemented are as follows:

1. A φ75 mm flexible plum flower mini ring, 5 petals, the height of the mini ring is 15 mm, the height/diameter ratio is 0.2, the height of the inner arc strip is 9 mm on which the flaps is 4 mm high.

2. A φ50 mm flexible plum flower mini ring, 5 petals, the height of the mini ring is 12.5 mm, the height/diameter ration is 0.25, the height of the inner arc strip is 7.5 mm on which the flaps is 3.5 mm high.

3. A φ38 mm flexible plum flower mini ring, 5 petals, the height of the mini ring is 11.4 mm, the height/diameter ratio is 0.3, the height of the inner arc strip is 6.6 mm on which the flaps is 3.0 mm high.

4. A φ50 mm flexible plum flower mini ring, 6 petals, the height of the mini ring is 12.5 mm, the height/diameter ratio is 0.25, the height of the inner arc strip is 7.5 mm on which the flaps is 3.5 mm high.

What is claimed is:

1. A packing comprising:
   an outer wall of packing material formed in the shape of a plum flower, presenting a plurality of arcuate petals;

at least one window formed in each petal and presenting side edges;

an inner strip of packing material connected to the side edges of each window and extending inboard of the outer wall; and a flap formed in each inner strip and being bent inward relative to the outer wall.

2. A packing as recited in claim 1, wherein the outer wall defines a height and a diameter, and the height/diameter ratio is 0.2–0.3.

3. A packing as recited in claim 1, wherein the outer wall presents four petals.

4. A packing as recited in claim 1, wherein the outer wall presents five petals.

5. A packing as recited in claim 1, wherein the outer wall presents six petals.

6. A packing as recited in claim 1, wherein the outer wall presents seven petals.

* * * * *